United States Patent Office 3,497,581
Patented Feb. 24, 1970

3,497,581
METHOD OF BONDING SINTERED DOLOMITE GRAINS UTILIZING $CO_2$ GAS
Josef Wuhrer, Wulfrath, Friedrich Bischoff, Hagen, and Herbert Richrath, Hagen-Halden, Germany, assignors to Dolomitwerke GmbH., Wulfrath, Germany, a corporation of Germany
No Drawing. Filed Sept. 13, 1968, Ser. No. 759,785
Claims priority, application Germany, Sept. 13, 1967, 1,646,487
Int. Cl. C04b 15/14, 33/32
U.S. Cl. 264—82                         2 Claims

ABSTRACT OF THE DISCLOSURE

Fire resistant molded bodies are produced by preparing a mixture of at least 5 percent by weight of crushed sintered dolomite grains in a base of uncrushed sintered dolomite grains. The mixture preferably comprises by weight 5–10 percent crushed sintered dolomite grains in a base of 90–95% uncrushed sintered dolomite grains. The crushed sintered dolomite content has a grain size of 0.3 to 3.0 mm. The mixture of crushed and uncrushed grains is pressed into molded bricks under pressure of at least 400 kg./cm.$^2$ and the bricks are treated with carbon dioxide containing gases at a temperature of 450 to 800° C. until at least 0.6 percent and preferably more than 1.0 percent by weight of $CO_2$ has been absorbed. The molded bricks are then impregnated with pitch or tar to further increase their air storability and compression strength.

CROSS REFERENCES TO RELATED APPLICATIONS

This application relates to copending application Ser. No. 628,293 filed Apr. 4, 1967 by Friedrich Bischoff and Josef Wuhrer, which generally discloses and claims a process for the production of fire resistant molded bodies from sintered dolomite which has a cold pressure strength of at least 200 kg./cm$^2$ and a high degree of stability for storage in air. The sinter is crushed for the purpose of achieving new fracture surfaces and is compressed under pressures of at least 400 kg./cm.$^2$ at a suitable grain structure into molded bodies, subsequently being gassed at 450° C. to 800° C. with $CO_2$ or gases containing $CO_2$ up to a $CO_2$ absorption of at least 0.6 percent by weight and then dipped into pitch or tar rich in pitch with a softening point above 40° C. In gassing with $CO_2$, a solid framework of carbonates develops, which considerably increases the cold pressure strength of the pressed object. This cold pressure strength is further increased through subsequent dipping into tar or pitch. Bricks produced by this process do no require a second calcination because the carbonate framework assures the compression strength up to the beginning of deacidification at about 800°C.

BACKGROUND OF THE INVENTION

The subject matter of the invention is the production of refractory bricks from sintered dolomite.

Refractories, e.g., bricks, blocks, and converter bottoms, prepared by pressing, tamping, vibrating, and the like from burned and subsequently crushed and grain sized dolomite, have a short storage life which is limited to a few days, due to their calcium oxide content. The moisture of the air hydrates the lime which results in disintegration of the shaped bodies. In order to improve the storability, it is known to heat the formed bodies once again at temperatures of 1500° C. and more for an average period of 24 hours, whereby the grains sinter together and a denser surface is obtained which is hydrated only slowly by the moisture of the atmosphere. Such second firing imparts to the bricks also a sufficient compression strength at ambient temperature. The storability is, on the average, 1 to 2 months; by additional dipping in tar or pitch, it can be increased to 3 or at the most 4 months.

SUMMARY

It is a primary object of the invention to eliminate said second firing with its attendant high cost, high temperature and long duration and to produce formed refractory bodies which possess at low temperatures a compression strength of at least 200 kg./cm.$^2$ and high strength and good storability in air. The present invention is based on the discovery that a mixture of a very small portion of the crushed sinter dolomite grains in a base of uncrushed sintered dolomite can be employed to impart a sufficient reactivity to the fire resistant basic material for the subsequent gas treatment and solidification with $CO_2$ and also to achieve a serration of the individual granules in the granulation mixture during the compression step, as a result of which the strength and density of the shaped bodies are increased.

The starting materials for the manufacture of the formed bodies comprise a mixture of a minor portion of crushed sintered dolomite grains and a major portion of uncrushed sintered magnesite grains. The crushed dolomite grain content of the mixture preferably is 5 to 10 percent and the uncrushed grain content up to 90 to 95 percent by weight.

It is advantageous to employ the crushed portion of the sintered dolomite mixture in a relatively fine grain size preferably from 0.3 to 3.0 mm. for the reason that the finer dolomite grains, due to their larger surfaces, react better with the $CO_2$ gases while forming a solidifying carbonate framework.

It has been found that compression of the mixture of uncrushed and crushed grains in the press causes the formation of a sufficient portion of fine grains such that, with the presence of at least 5 percent by weight of precrushed sintered dolomite, a sufficient binding of the granulation is achieved in the $CO_2$ gassing treatment to form a shaped body having a high cold compression strength.

Thus, sintered dolomite in minor amount may be used as the fine grained portion and dolomite as the coarse grained portion may be used in major amount in order to obtain better characteristics for storage stability because the hydration is favored by larger surfaces, especially in the case of a larger portion of fine grain in the dolomite. However, a certain portion of fine grain in the grain band is effective in order to obtain greater strength values and packing densities.

In another aspect of the invention it has been found possible to replace a portion of the uncrushed sintered grains with burned lime or sintered magnesite.

In a further aspect of the invention it is possible to sift the desired granulation from the calcined materials which drop into the furnace and to employ same directly from the production of refractory bodies. As is well known, such materials dropping into the furnace have a greater hydration resistance than that exhibited by crushed grain as a result of the sintering skin produced during the calcining; whereas, in the case of crushed grain the sintering skin is damaged.

During compression of the uncrushed grains in the compacting step, it has been found that sufficient fresh fractures develop to provide a satisfactory base to which the addition of 5 to 10 percent by weight of precrushed fine grains is sufficient for solidifying with carbonic acid. It has been found that the fracture surfaces of the uncrushed grains are protected against hydration after the gassing treatment through the superficial layer of carbonate.

In order to ensure the $CO_2$ absorption in the gassing operation at a sufficient rate, it is of advantage to crush sintered dolomite so as to produce fresh fractures just prior to pressing. A suitable mixture, blended from the crushed and uncrushed grains, is compacted to form bodies, preferably by pressing. The compacting can be, of course, prepared and improved by previous vibrating and/or tamping. Subsequently, the gassing of the formed bodies can be carried out continuously in a conventional tunnel or tempering oven or discontinuously in individual gassing chambers. Pure carbon dioxide, or dry waste gases containing carbon dioxide, may be employed. When, in the use of waste gases, the gassing, is carried out at temperatures above the hydration temperature of the CaO, drying of said gases is not absolutely necessary. The formed bodies should be allowed to cool in a moisture-free atmosphere, which should preferably contain $CO_2$. The times and temperatures for the gassing operation depend on the composition of the starting materials and on the $CO_2$ content of the gases. The required minimum temperatures are readily determined by a preliminay test for any special mixture, taking into account that a minimum amount of 0.6 percent by weight of $CO_2$, calculated on the dolomite portion, must be absorbed.

The gassing temperatures employed are in the range of 450–480° C. However, if gassing is performed with the application of pressure, the gassing temperatures may be lowered and the time for absorption of a specified $CO_2$ content may be lessened.

An increased $CO_2$ content increases the storability in air and the low temperature compression strength. Absorption of more than 0.6 percent, and preferably more than 1 percent by weight of $CO_2$ calculated on the sintered dolomite, produces a considerable improvement of said properties.

The various burned dolomite types can be defined by their weight per liter. For instance, at a grain size of 5–12 mm. the weight per liter of soft burned dolomite is about 800–1000 g./l. that of medium burned dolomite is about 1000–1250 g./l.; hard-burned dolomite has a weight of about 1250–1500 g./l. and sintered dolomite at least 1500 g./l. frequently more than 1600 g./l. and sometimes even more than 1700 g./liter.

The refractory shapes obtained after gassing have frequently already an increased low temperature compression strength and sufficient storability in air. However, said properties are considerably improved by subsequent dipping in tar, pitch-containing tar, or pitch, or similar organic products wherey the refractory art does not make any distinction between petroleum base and coal base materials. It is only necessary that the softening point of said substances is above 40° C. For the dipping operation, they are, therefore, liquefied by heating; said operation may be also carried out under reduced pressure.

A higher portion of pitch in the dipping tar can be employed to increase the compressive strength and carbon content of the refractory brick.

Typical practice of the invention is exemplified in the following example in which the details are given by way of illustration, and are not to be construed as limiting the invention.

EXAMPLE 1

A granulation consisting of 0.3 to 1.5 mm. and 0.5 to 3 mm. of sintered dolomite, dropped in a furnace and made in a cylindrical rotary kiln was mixed in a ratio of 1:1. 10 percent by weight of finely ground sintered dolomite was added to this mixture, along with 2 percent by weight of wax, whereupon the mixture was compressed into test bodies of the dimension of 50 x 50 mm. under a pressure of 1.2 $t/cm.^2$ and subsequently treated with gas in a $CO_2$ atmosphere at 500° C. for 1 hour. After cooling off, the test body had a cold pressure strength of 86 kg./cm.$^2$ and had absorbed 0.71 percent by weight of $CO_2$. After dipping into tar, the cold compression strength amounted to 270 kg./cm.$^2$ and its resistance to storage in air was more than 5 months.

I claim:
1. A method of preparing refractories having a low temperature compression strength of at least 200 kg./cm.$^2$ and good storability which comprises
   (a) preparing a mixture comprising at least 5 percent by weight of crushed sintered dolomite grains having a grain size in the range of 0.3 to 3.0 mm. and the remainder of uncrushed sintered dolomite grains.
   (b) pressing said grains to shapes under a pressure of at least 400 kg./cm.$^2$.
   (c) treating said shapes with carbon dioxide at a temperature of 450 to 800° C. until said shapes have absorbed at least 0.6 percent by weight of carbon dioxide,
   (d) cooling said shapes, and
   (e) dipping said shapes into a member of the group consisting of tar, pitch-containing tar and pitch having a softening point above 40° C.
2. The method of claim 1 wherein the crushed sintered dolomite is present in a 50–50 mixture, the respective portions having a grain size in the range of 0.3 to 1.5 mm. and 0.5 to 3.0 mm.

References Cited
UNITED STATES PATENTS

| | | | |
|---|---|---|---|
| 2,547,323 | 4/1951 | Heuer | 106—59 |
| 2,616,150 | 11/1952 | Vettel | 106—61 |
| 2,639,993 | 5/1953 | Heuer | 264—56 |
| 2,656,279 | 10/1953 | Heuer | 106—58 |
| 3,108,860 | 10/1963 | Davies et al. | 264—65 |
| 3,329,515 | 7/1967 | Leopold | 264—82 |
| 2,536,073 | 1/1951 | McGarvey | 264—82 |

JULIUS FROME, Primary Examiner

JOHN H. MILLER, Assistant Examiner

U.S. Cl. X.R.

106—58, 61; 264—56, 65